US012630699B2

(12) United States Patent
Baccaro et al.

(10) Patent No.: US 12,630,699 B2
(45) Date of Patent: May 19, 2026

(54) FILM COMPRISING HETEROPHASIC PROPYLENE COPOLYMER COMPOSITION

(71) Applicant: SABIC GLOBAL TECHNOLOGIES B.V., Bergen op Zoom (NL)

(72) Inventors: Lucio Baccaro, Isernia (IT); Kathleen Ann Vandewiele, Diepenbeek (BE); Désirée Marie Louise Seegers, Maastricht (NL); Marilena Pezzuto, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 170 days.

(21) Appl. No.: 17/795,430

(22) PCT Filed: Feb. 12, 2021

(86) PCT No.: PCT/EP2021/053398
§ 371 (c)(1),
(2) Date: Jul. 26, 2022

(87) PCT Pub. No.: WO2021/160773
PCT Pub. Date: Aug. 19, 2021

(65) Prior Publication Data
US 2023/0071198 A1    Mar. 9, 2023

(30) Foreign Application Priority Data

Feb. 14, 2020    (EP) ..................................... 20157459
Feb. 14, 2020    (EP) ..................................... 20157463

(51) Int. Cl.
| | |
|---|---|
| *C08L 23/12* | (2006.01) |
| *B32B 7/02* | (2019.01) |
| *B32B 27/08* | (2006.01) |
| *B32B 27/32* | (2006.01) |
| *B32B 37/15* | (2006.01) |
| *C08F 110/06* | (2006.01) |

(52) U.S. Cl.
CPC ............... *C08L 23/12* (2013.01); *B32B 7/02* (2013.01); *B32B 27/08* (2013.01); *B32B 27/32* (2013.01); *B32B 37/15* (2013.01); *C08F 110/06* (2013.01); *B32B 2250/242* (2013.01); *B32B 2307/31* (2013.01); *B32B 2307/406* (2013.01); *B32B 2307/414* (2013.01); *B32B 2307/538* (2013.01); *B32B 2307/558* (2013.01); *B32B 2307/732* (2013.01); *B32B 2323/10* (2013.01); *B32B 2439/70* (2013.01)

(58) Field of Classification Search
CPC .. C08L 23/12; C08L 2203/16; C08L 2207/02; B32B 7/02; B32B 27/08; B32B 27/32; B32B 37/15; B32B 2250/242; B32B 2307/31; B32B 2307/406; B32B 2307/414; B32B 2307/538; B32B 2307/558; B32B 2307/732; B32B 2323/10; B32B 2439/70; B32B 2439/80; C08F 110/06; C08F 210/06; C08J 2323/12; C08J 2423/16; C08J 5/18
See application file for complete search history.

(56) References Cited

U.S. PATENT DOCUMENTS

| | | | |
|---|---|---|---|
| 4,399,054 | A | 8/1983 | Ferraris et al. |
| 4,472,524 | A | 9/1984 | Albizzati |
| 4,771,024 | A | 9/1988 | Nestlerode et al. |
| 4,866,022 | A | 9/1989 | Arzoumanidis et al. |
| 5,093,415 | A | 3/1992 | Brady, III et al. |
| 6,825,146 | B2 | 11/2004 | Kilty et al. |
| 2004/0048084 | A1 | 3/2004 | Rhee et al. |
| 2008/0220226 | A1 | 9/2008 | Koehn et al. |
| 2016/0159996 | A1 | 6/2016 | Angelini et al. |

(Continued)

FOREIGN PATENT DOCUMENTS

| | | |
|---|---|---|
| EP | 2143760 A1 | 1/2010 |
| EP | 2540497 A1 | 1/2013 |

(Continued)

OTHER PUBLICATIONS

Butterworth, S., "On the Theory of Filter Amplifiers," Experimental Wireless & The Wireless Engineer; Oct. 1930, pp. 536-541.

(Continued)

*Primary Examiner* — Nathan L Van Sell
(74) *Attorney, Agent, or Firm* — CANTOR COLBURN LLP

(57) ABSTRACT

The invention relates to a film comprising at least one first layer consisting of a heterophasic propylene copolymer composition comprising a heterophasic propylene copolymer, wherein the heterophasic propylene copolymer is present in an amount of at least 95 wt % based on the heterophasic propylene copolymer composition, wherein the heterophasic propylene copolymer consists of a) a propylene-based matrix wherein the propylene-based matrix consists of a propylene homopolymer and b) a dispersed ethylene α-olefin copolymer, wherein the sum of the weight of the propylene-based matrix and the weight of the dispersed ethylene-α-olefin copolymer is 100 wt % based on the heterophasic propylene copolymer, wherein the amount of xylene-soluble matter (CXS) in the heterophasic propylene copolymer composition is in the range from 20.0 to 35.0 wt % based on the heterophasic propylene copolymer composition, wherein the CXS is measured according to ISO 16152:2005 in p-xylene at 25° C.

14 Claims, No Drawings

(56)               References Cited

U.S. PATENT DOCUMENTS

2019/0367715 A1    12/2019   Wang et al.
2020/0010599 A1*    1/2020   Yamada ................... C08K 3/00

FOREIGN PATENT DOCUMENTS

| EP | 3078490 | A1 | 10/2016 |
| WO | 9632426 | A1 | 10/1996 |
| WO | 2013092620 | A1 | 6/2013 |
| WO | 2014180639 | A1 | 11/2014 |
| WO | 2015091983 | A1 | 6/2015 |
| WO | 2017071847 | A1 | 5/2017 |
| WO | WO-2017144466 | A1 * | 8/2017 |
| WO | 2018141672 | A1 | 8/2018 |

OTHER PUBLICATIONS

International Search Report for International Application No. PCT/EP2021/053398, International Filing Date Feb. 12, 2021, Date of Mailing May 3, 2021, 5 pages.
Ser Van Der Ven; "Polypropylene and other Polyolefins"; Elsevier 1990, pp. 8-10.
Written Opinion for International Application No. PCT/EP2021/053398, International Filing Date Feb. 12, 2021, Date of Mailing May 3, 2021, 5 pages.

* cited by examiner

FILM COMPRISING HETEROPHASIC PROPYLENE COPOLYMER COMPOSITION

CROSS REFERENCE TO RELATED APPLICATIONS

This application is a National Stage application of PCT/EP2021/053398, filed Feb. 12, 2021, which claims the benefit of European Application No. 20157459.7, filed Feb. 14, 2020, and European Application No. 20157463.9, filed Feb. 14, 2020, all of which are incorporated by reference in their entirety herein.

FIELD

The present invention relates to a film comprising a heterophasic propylene copolymer composition, to a process for preparing said film, to a package comprising said film and to the use of the heterophasic propylene copolymer composition for preparing films.

BACKGROUND

Polyolefin films are well balanced in terms of price and performance and are widely used, for example for packaging foods and goods, for coating of paper and other materials, or as lamination materials. The use of polypropylene in films has the advantage of a good stiffness and thermal resistance as compared to polyethylene. Furthermore, heterophasic propylene copolymers are preferred polypropylenes for their good impact-stiffness balance.

A film comprising a heterophasic propylene copolymer is for example disclosed in WO2018/138235A1 and in WO2015/010858A1.

WO2018/138235A1 discloses the use of a heterophasic propylene copolymer, wherein the heterophasic propylene copolymer (HECO) comprises a matrix (M) being a propylene homopolymer (H-PP) and an elastomeric propylene copolymer (EPC) dispersed in said matrix (M), wherein the heterophasic propylene copolymer (HECO) has a) a melt flow rate MFR 2(2.16 kg, 230° C.) measured according to ISO 1 133 in the range of 0.2 to 8.0 g/10 min, (b) a xylene cold soluble content (XCS) determined according ISO 16152 (25° C.) in the range of 10.0 to 20.0 wt %, and (c) a total ethylene comonomer content in the range of more than 2.5 to 8.0 wt %, wherein further (d) the melt flow rate MFR 2 (2.16 kg, 230° C.) measured according to ISO 1 133 of the matrix (M) is in the range of 0.2 to 4.0 g/10 min (e) the ethylene comonomer content of xylene cold soluble (XCS) fraction of the heterophasic propylene copolymer is in the range of 25.0 to 40.0 wt %, (f) the intrinsic viscosity (IV) determined according to DIN ISO 1628/1 (in decalin at 135° C.) of the xylene cold soluble (XCS) fraction of the heterophasic propylene copolymer is in the range of more than 1.0 to below 2.9 dl/g, and (e) the relative content of isolated to block ethylene sequences (1(E)) of the XCS fraction fulfilling the inequation (I) I(E)(XCS)<54–0.81×C2(XCS) (I) wherein C2 is the comonomer content [wt %] of the XCS fraction, XCS is the amount of xylene cold soluble fraction in [wt %] and wherein the I(E) content is defined by equation (II) I(E)=fPEP/((fEEE+fPEE+ fPEP))*100 (II) wherein 1(E) is the relative content of isolated to block ethylene sequences of the XCS fraction [in %]; fPEP is the mol fraction of propylene/ethylene/propylene sequences (PEP) of the XCS fraction; fPEE is the mol fraction of propylene/ethylene/ethylene sequences (PEE) and of ethylene/ethylene/propylene sequences (EEP) of the XCS fraction; fEEE is the mol fraction of ethylene/ethylene/ethylene sequences (EEE) of the XCS fraction, wherein all sequence concentrations are based on a statistical triad analysis of 13C-NMR data from the XCS fraction of the heterophasic copolymer, for the production of films, being suitable as packaging film for consumer goods, as well as for medical packaging.

WO2015/010858A1 discloses a film or sheet comprising at least one layer comprising a heterophasic propylene copolymer comprising:

(a) from 85% to 92% by weight of a matrix phase being a propylene homopolymer or a propylene copolymer containing up to 5% by weight of units derived from ethylene and/or an alpha-olefin; and (b) from 8% to 15% by weight of a rubber phase that is an ethylene-propylene copolymer containing from 40% to 60% by weight of ethylene-derived units;

wherein the overall amount of component (a) and of component (b) is 100% by weight, wherein the heterophasic propylene copolymer contains up to 6.0% by weight of ethylene-derived units.

However, a disadvantage of these heterophasic propylene copolymers, is that in films, they do not show a high impact under all use temperatures. For example, for certain applications, such as food packaging, it is desirable that the film has a high impact under all use temperature, such as at –20° C. (when in the freezer), at around 0° C. (when in the refridgerator) as well as under room temperature (during use). This will reduce the undesired breaking of the packaging if such packaging is accidentally dropped.

Therefore, it is the object of the invention to provide films based on a heterophasic propylene copolymer that show a high impact at –20° C., as well as at 0° C. and 23° C.

SUMMARY

This object is achieved by a film comprising at least one first layer consisting of a heterophasic propylene copolymer composition comprising a heterophasic propylene copolymer, wherein the heterophasic propylene copolymer is present in an amount of at least 95 wt % based on the heterophasic propylene copolymer composition, wherein the heterophasic propylene copolymer consists of a) a propylene-based matrix wherein the propylene-based matrix consists of a propylene homopolymer and b) a dispersed ethylene α-olefin copolymer, wherein the sum of the weight of the propylene-based matrix and the weight of the dispersed ethylene-α-olefin copolymer is 100 wt % based on the heterophasic propylene copolymer, wherein the amount of xylene-soluble matter (CXS) in the heterophasic propylene copolymer composition is in the range from 20.0 to 35.0 wt % based on the heterophasic propylene copolymer composition, wherein the CXS is measured according to ISO 16152:2005 in p-xylene at 25° C.

It has surprisingly been found that the films of the invention display a high impact at –20° C., as well as at 0° C. and 23° C.

In addition, the films of the invention may have a low seal initiation temperature and/or a good processing window, i.e. a high temperature difference between the melting temperature and the seal initiation temperature.

DETAILED DESCRIPTION

Heterophasic Propylene Copolymer

Heterophasic propylene copolymers are generally prepared in one or more reactors, by polymerization of propylene in the presence of a catalyst and subsequent polymerization of ethylene with α-olefins. The resulting polymeric materials are heterophasic, but the specific morphology usually depends on the preparation method and monomer ratios used.

The heterophasic propylene copolymers employed in the film according to present invention can be produced using any conventional technique known to the skilled person, for example a multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524. Preferably, the heterophasic propylene copolymer is made using a Ziegler-Natta catalyst.

The heterophasic propylene copolymer may be prepared by a process comprising polymerizing propylene n the presence of a catalyst system to obtain the propylene homopolymer and subsequently polymerizing ethylene with α-olefins in the presence of a catalyst system and the propylene-based matrix to obtain the heterophasic propylene copolymer consisting of a propylene-based matrix and a dispersed phase. These steps are preferably performed in different reactors. The catalyst systems for the first step and for the second step may be different or same.

Catalyst System

Ziegler-Natta catalyst systems are well known in the art. The term normally refers to catalyst systems comprising a transition metal containing solid catalyst compound (procatalyst) and an organo-metal compound (co-catalyst). Optionally one or more electron donor compounds (external donor) may be added to the catalyst system as well.

The transition metal in the transition metal containing solid catalyst compound is normally chosen from groups 4-6 of the Periodic Table of the Elements (Newest IUPAC notation); more preferably, the transition metal is chosen from group 4; the greatest preference is given to titanium (Ti) as transition metal.

Although various transition metals are applicable, the following is focused on the most preferred one being titanium. It is, however, equally applicable to the situation where other transition metals than Ti are used. Titanium containing compounds useful in the present invention as transition metal compound generally are supported on hydrocarbon-insoluble, magnesium and/or an inorganic oxide, for instance silicon oxide or aluminum oxide, containing supports, generally in combination with an internal electron donor compound. The transition metal containing solid catalyst compounds may be formed for instance by reacting a titanium (IV) halide, an organic internal electron donor compound and a magnesium and/or silicon containing support. The transition metal containing solid catalyst compounds may be further treated or modified with an additional electron donor or Lewis acid species and/or may be subjected to one or more washing procedures, as is well known in the art.

Some examples of Ziegler-Natta (pro)catalysts and their preparation method which can suitably be used to prepare the heterophasic propylene copolymer can be found in EP 1 273 595, EP 0 019 330, U.S. Pat. No. 5,093,415, Example 2 of U.S. Pat. No. 6,825,146, U.S. Pat. No. 4,771,024 column 10, line 61 to column 11, line 9, WO03/068828, U.S. Pat. No. 4,866,022, WO96/32426A, example I of WO 2007/134851 A1 and in WO2015/091983 all of which are hereby incorporated by reference.

The (pro)catalyst thus prepared can be used in polymerization of the heterophasic propylene copolymer using an external donor, for example as exemplified herein, and a co-catalyst, for example as exemplified herein.

In one embodiment, the heterophasic propylene copolymer is made using a catalyst which is free of phthalate.

It is preferred to use so-called phthalate free internal donors because of increasingly stricter government regulations about the maximum phthalate content of polymers. In the context of the present invention, "essentially phthalate-free" or "phthalate-free" means having a phthalate content of less than for example 150 ppm, alternatively less than for example 100 ppm, alternatively less than for example 50 ppm, alternatively for example less than 20 ppm, for example of 0 ppm based on the total weight of the catalyst. Examples of phthalates include but are not limited to a dialkylphthalate esters in which the alkyl group contains from about two to about ten carbon atoms. Examples of phthalate esters include but are not limited to diisobutylphthalate, ethylbutylphthalate, diethylphthalate, di-n-butylphthalate, bis(2-ethylhexyl)phthalate, and diisodecylphthalate.

Examples of phthalate free internal donors include but are not limited to 1,3-diethers, for example 9,9-bis (methoxymethyl) fluorene, optionally substituted malonates, maleates, succinates, glutarates, benzoic acid esters, cyclohexene-1,2-dicarboxylates, benzoates, citraconates, aminobenzoates, silyl esters and derivatives and/or mixtures thereof.

The catalyst system comprising the Ziegler-Natta procatalyst may be activated with an activator, for example an activator chosen from the group of benzamides and monoesters, such as alkylbenzoates.

The catalyst system includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst as are known to the skilled person. Preferably, the cocatalyst is selected from trimethylaluminium, triethylaluminum, tri-isobutylaluminum, trihexylaluminum, di-isobutylaluminum hydride, trioctylaluminium, dihexylaluminum hydride and mixtures thereof, most preferably, the cocatalyst is triethyl-aluminium (abbreviated as TEAL).

Examples of external donors are known to the person skilled in the art and include but are not limited to external electron donors chosen from the group of compounds having a structure according to Formula III $(R^{90})_2N$—$Si(OR^{91})_3$, compounds having a structure according to Formula IV: $(R^{92})Si(OR^{93})_3$ and mixtures thereof, wherein each of $R^{90}$, $R^{91}$, $R^{92}$ and $R^{93}$ groups are each independently a linear, branched or cyclic, substituted or unsubstituted alkyl having from 1 to 10 carbon atoms, preferably wherein $R^{90}$, $R^{91}$, $R^{92}$ and $R^{93}$ groups are each independently a linear unsubstituted alkyl having from 1 to 8 carbon atoms, for example ethyl, methyl or n-propyl, for example diethylaminotriethoxysi-lane (DEATES), n-propyl triethoxysilane, (nPTES), n-pro-pyl trimethoxysilane (nPTMS); and organosilicon com-pounds having general formula $Si(OR^a)_{4-n}R^b{}_n$, wherein n can be from 0 up to 2, and each of $R^a$ and $R^b$, independently, represents an alkyl or aryl group, optionally containing one or more hetero atoms for instance O, N, S or P, with, for instance, 1-20 carbon atoms; such as diisobutyl dimethox-ysilane (DiBDMS), t-butyl isopropyl dimethyxysilane (tBuPDMS), cyclohexyl methyldimethoxysilane (CHMDMS), dicyclopentyl dimethoxysilane (DCPDMS) or di(iso-propyl) dimethoxysilane (DiPDMS). More prefer-ably, the external electron donor is chosen from the group of di(iso-propyl) dimethoxysilane (DiPDMS) or diisobutyl dimethoxysilane (DiBDMS).

In a preferred embodiment, the heterophasic propylene copolymer is produced from propylene and ethylene in a polymerization process, for example a gas phase polymer-ization process, in the presence of a) a Ziegler-Natta procatalyst comprising compounds of a transition metal of Group 4 to 6 of IUPAC, a Group 2 metal compound and an internal donor, wherein said internal donor is a non-phthalic compound (that is a compound that does not contain phthalates), preferably a non-phthalic acid ester;

b) a co-catalyst (Co), and c) optionally an external donor (ED), preferably a non-phthalic compound.

Propylene-Based Matrix

The heterophasic propylene copolymer of the composi-tion of the invention consists of a propylene-based matrix and a dispersed ethylene-α-olefin copolymer. The propyl-ene-based matrix typically forms the continuous phase in the heterophasic propylene copolymer. The amounts of the propylene-based matrix and the dispersed ethylene-α-olefin copolymer may be determined by $^{13}$C-NMR as well known in the art. The propylene-based matrix consists of a propyl-ene homopolymer.

For purpose of the present invention, propylene unit refers to the moiety derived from propylene which is incorporated into the polymer chain during the polymerization; Mutatis mutandis, comonomer unit refers to the moiety derived from the respective comonomer which is incorporated into the polymer chain during the polymerization.

The propylene-based matrix is preferably present in an amount of 65 to 80 wt %, for example in an amount of 70 to 80 wt % based on the heterophasic propylene copolymer.

It is preferred that the propylene homopolymer or pro-pylene-copolymer in the propylene-based matrix has an isotacticity of at least 96.5 wt % based on the propylene homopolymer or propylene-copolymer. For example, the isotacticity of the propylene homopolymer or propylene-copolymer in the propylene-based matrix is at most 99 wt %. The isotacticity is determined using $^{13}$C NMR.

The propylene-based matrix is preferably semi-crystal-line, that is it is not 100% amorphous, nor is it 100% crystalline. For example, the propylene-based matrix has a crystallinity of at least 40%, for example at least 50% and/or for example at most 80%. For example, the propylene-based matrix has a crystallinity in the range from 40% to 80%. For purpose of the invention, the degree of crystallinity of the propylene-based matrix is measured using differential scan-ning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

The melt flow index (MFI) of the propylene-based matrix of the heterophasic propylene copolymer, $MFI_M$, may be for example at least 1.0 dg/min, at least 1.5 dg/min, and/or for example at most 10.0 dg/min, for example at most 7.0 dg/min, for example at most 5.0 dg/min as measured accord-ing to ISO1133-1:2011 (2.16 kg/230° C.). The $MFI_M$ may for example be in the range from 1.0 to 10.0 dg/min, for example from 1.5 to 7.0 dg/min, for example 1.5 to 6.0 dg/min, wherein the $MFI_M$ is measured according to ISO01133-1:2011 (2.16 kg/230° C.).

Dispersed Ethylene-α-Olefin Copolymer

Besides the propylene-based matrix, the heterophasic propylene copolymer also consists of a dispersed ethylene-α-olefin copolymer. The dispersed ethylene-α-olefin copo-lymer is also referred to herein as the 'dispersed phase'. The dispersed phase is embedded in the heterophasic propylene copolymer in a discontinuous form. The particle size of the dispersed phase is typically in the range from 0.05 to 2.0 microns, as may be determined by transmission electron microscopy (TEM). The amount of the dispersed ethylene-α-olefin copolymer in the heterophasic propylene copoly-mer may herein be sometimes referred as RC and can be determined using $^{13}$C NMR.

The dispersed ethylene-α-olefin copolymer is present in the heterophasic propylene copolymer (A) in an amount in a range from 20 to 35 wt % based on the heterophasic propylene copolymer, for example in a range from 20 to 30 wt % based on the heterophasic propylene copolymer.

The amount of ethylene monomer units in the ethylene-α-olefin copolymer is preferably from 40 to 60 wt %, for example from 45 to 55 wt % based on the ethylene-α-olefin copolymer. Preferably the amount of ethylene monomer units in the ethylene-α-olefin copolymer is at least 40 wt %, preferably at least 45 wt % and/or preferably at most 60 wt %, preferably at most 55 wt % based on the ethylene-α-olefin copolymer. The amount of ethylene monomer units in the dispersed ethylene-α-olefin copolymer in the heteropha-sic propylene copolymer may herein be sometimes referred as RCC2.

The α-olefin units in the ethylene-α-olefin copolymer are preferably chosen from the group of units of α-olefins having 3 to 8 carbon atoms. Examples of suitable units of α-olefins having 3 to 8 carbon atoms include but are not limited to units of propylene, 1-butene, 1-pentene, 4-methyl-1-pentene, 1-hexene, 1-heptene and 1-octene. More prefer-ably, the α-olefin units in the ethylene-α-olefin copolymer are chosen from the group of units of α-olefins having 3 to 4 carbon atoms and any mixture thereof, more preferably the α-olefin units are propylene units, in which case the ethylene-α-olefin copolymer is ethylene-propylene copolymer.

The melt flow index (MFI) of the dispersed ethylene α-olefin copolymer in the heterophasic propylene copolymer (MFI$_R$), may be for example at least 0.0010 dg/min, at least 0.010 dg/min and/or for example at most 1.0 dg/min, at most 0.80 dg/min. The MFI$_R$ may be in the range for example from 0.0010 to 1.0 dg/min, for example from 0.010 to 0.80 dg/min, wherein the MFI$_R$=MFI$_{rubber}$ is determined according to ISO1133-1:2011 using 2.16 kg at a temperature of 230° C. according to the following formula:

$$MFIrubber = 10^{\wedge}\left(\frac{\text{Log } MFIheterophasic - \text{matrix content} * \text{Log } MFImatrix}{\text{rubber content}}\right)$$

wherein
- MFIheterophasic is the MFI (dg/min) of the heterophasic propylene copolymer composition as measured according to ISO1133-1:2011 (2.16kg/230° C.), MFImatrix is the MFI$_M$ (dg/min) (MFI of the propylene-based matrix) measured according to ISO1133-1:2011 (2.16 kg/230° C.),
- matrix content is the fraction of the propylene-based matrix in the heterophasic propylene copolymer,
- rubber content is the fraction of the dispersed ethylene-α-olefin copolymer in the heterophasic propylene copolymer. For the avoidance of any doubt, Log in the formula means log$_{10}$.

Preferably, the ratio of the melt flow rate of the propylene-based matrix as determined according to ISO1133-1:2011 using 2.16 kg at a temperature of 230° C. (MFR$_M$) to the melt flow rate of the ethylene-α-olefin copolymer as determined according to ISO1133-1:2011 using 2.16 kg at a temperature of 230° C. (MFR$_R$) is in the range from 1.0 to 1000.

The wording melt flow rate (MFR) and melt flow index (MFI) are used interchangeably herein.

Heterophasic Propylene Copolymer Composition

In the heterophasic propylene copolymer composition, the heterophasic propylene copolymer is preferably present in an amount of at least 95 wt %, for example of at least 96 wt %, for example of at least 97 wt %, for example of at least 98 wt %, for example of at least 99 wt % based on the heterophasic propylene copolymer composition. The heterophasic propylene copolymer composition may further comprise additives. Examples of suitable additives include but are not limited to anti-block agents, slip agents, UV stabilisers, antioxidants, and processing aids.

The melt flow rate of the heterophasic propylene copolymer composition is preferably in the range from 0.50 to 10.0 dg/min. For blown film, the preferred melt flow rate of the heterophasic propylene copolymer composition is preferably in the range from 0.80 to 5.0 dg/min, more preferably in the range from 0.80 to 3.0 dg/min. For cast film, the preferred melt flow rate of the heterophasic propylene copolymer composition is preferably in the range from 1.0 to 10.0 dg/min, for example in the range from 4.0 to 10.0 dg/min. For purpose of the invention, the melt flow rate of the heterophasic propylene copolymer composition is defined as the melt flow rate that is determined according to ISO 1133:2011 at 230° C. and 2.16 kg.

Preferably, the heterophasic propylene copolymer composition has an Mw/Mn in the range from 6.0 to 10.0, wherein Mw stands for the weight average molecular weight and Mn stands for the number average weight and wherein Mw and Mn are measured according to ISO16014-1(4):2003.

Preferably, the total amount of ethylene monomer units in the heterophasic propylene copolymer composition (also referred to herein as TC2) is in the range from 8.0 to 21.0 wt %, for example in the range from 9.0 to 15.0 wt % based on the heterophasic propylene copolymer composition. The TC2 is determined by $^{13}$C NMR spectroscopy.

The amount of the xylene-soluble matter (CXS) in the heterophasic propylene copolymer composition is in the range from 20.0 to 35.0 wt % based on the heterophasic propylene copolymer composition, preferably in the range from 20.0 to 30.0 wt % based on the heterophasic propylene copolymer composition, wherein the CXS is measured according to ISO 16152:2005 in p-xylene at 25° C.

The crystallization temperature (Tc) of the heterophasic propylene copolymer composition is preferably in the range from 116 to 130° C., wherein the Tc is determined by differential scanning calorimetry on the heterophasic propylene copolymer composition using the first cooling curve and wherein cooling and heating rates of 10° C./min are used.

The melting temperature (Tc) of the heterophasic propylene copolymer composition is preferably in the range from 116 to 130° C., wherein the Tc stands for the crystallization temperature as determined by differential scanning calorimetry on the heterophasic propylene copolymer composition using the first cooling curve and wherein cooling and heating rates of 10° C./min are used.

The seal initation temperature (SIT) of the heterophasic propylene copolymer composition is preferably in the range from 110 to 125° C., wherein the SIT stands for the lowest temperature at which a fin seal of the film prepared according to ASTM F2029-16 achieves a sealing strength of 0.5 N/10 mm as determined by ASTM F88 -15

Preferably, the film of the present invention has a Tm−SIT≥40° C., more preferably Tm−SIT≥43° C., even more preferably Tm−SIT≥45° C.,
- wherein SIT stands for the lowest temperature at which a fin seal of the film prepared according to ASTM F2029-16 achieves a sealing strength of 0.5 N/10 mm as determined by ASTM F88 -15,
- wherein Tm stands for melting temperature as determined by differential scanning calorimetry using the second heating curve and wherein cooling and heating rates of 10° C./min are used.

Film

The film of the invention may be a single-layer, but is preferably a multi-layer film. The multi-layer film may for example comprise from 3 to 15 layers, preferably from 3 to 11 layers, more preferably from 3 to 7 layers. The film of the invention may for example comprise 3 or 5 or 7 layers.

The film of the invention may be used as such, but may also be positioned in another multi-layer structure, such as for example a retort package, wherein further layers such as an aluminium layers, a polyethylene layer, a polypropylene layer, a polystyrene layer and/or a polyethylene terephthalate layer may be present.

In case of a multi-layer film, preferably, the other layers consists of polyolefin compositions comprising a polyolefin chosen from the group of polyethylenes, polypropylenes and mixtures thereof, more preferably chosen from the group of polypropylenes.

In a special embodiment, the invention relates to a film of the invention, comprising the first layer and one or more further layers, wherein at least one of, preferably all of the one of more further layers consist of a polypropylene composition comprising a polypropylene chosen from the group selected of heterophasic propylene copolymer, propylene homopolymer, propylene random copolymer, propylene terpolymer and mixtures thereof, preferably wherein the polypropylene composition is present in an amount of at least 95 wt % based on the layer. Such one or more further layers may further comprise additives as exemplified herein.

In a special embodiment, the invention relates to a film of the invention, wherein all layers consist of the heterophasic propylene copolymer composition. The film of this embodiment has the advantage of being flexible and displaying a high impact at −20° C., as well as at 0° C. and 23° C., while at the same time, it is primarily based on only one type of polyolefin, which makes recycling more efficient.

In practice, it is desired to prepare films having a low thickness as this allows the use of less material and reduces the carbon footprint of such films. Typically, therefore, the thickness of the films of the invention will be in the range from 15 to 200 μm, for example in the range from 20 to 100 μm. However, the thickness preference may depend based on the type of films and/or their preparation process. For example, for biaxially oriented films, the thickness is preferably in the range from 15 to 60 μm. For blown films, the thickness is preferably in the range from 15 to 100 μm. For cast films the thickness is preferably in the range from 50 to 200 μm.

Examples of heterophasic propylene copolymers include but are not limited to those mentioned herein. Examples of propylene random copolymers include but are not limited to propylene-ethylene copolymers, propylene-butene copolymers, propylene-hexene copolymers and mixtures thereof. Examples of propylene terpolymers include but are not limited to propylene-ethylene-butene copolymers, propylene-ethylene-hexene copolymers and mixtures thereof.

The film of the invention may be prepared using any film processes known in the art, for example by a blown film process, also known as a blown film extrusion process; or by using a cast extrusion process or by a biaxial orientation extrusion process, for example a tenter frame process.

In another aspect, therefore, the invention relates to a process for the preparation of a film according to any one of the preceding claims comprising the steps of a) providing the heterophasic propylene copolymer composition and b) preparing the film for example by a cast extrusion process or by a blown film process or by a biaxial orientation extrusion process, for example a tenter frame process.

In another aspect, the invention relates to use of the heterophasic propylene copolymer composition to prepare a film, for example a blown film, a cast film or a biaxially oriented film, preferably, wherein the heterophasic propylene copolymer composition is used in an amount of at least 95 wt % based on the layer of the film.

In another aspect, the invention relates to an article comprising the film of the invention, for example a blown film, a cast film or a biaxially oriented film; for example wherein the article is a corrugated sheet or a (food) package, preferably wherein the package is a pouch, more preferably wherein the package is a retort pouch.

For purpose of the invention, retort pouch is defined as a pouch that is filled with a (food) product that would normally spoil at room temperature, and is subsequently retorted (sterilized with heat) to create a shelf-stable packaged product. An unfilled pouch that is capable of being filled with product and subsequently retorted is also termed a retort pouch.

In a special embodiment, the invention relates to a matte film, in particular the invention relates to a multi-layer film comprising (a) a first outer layer (b) an inner layer, and (c) a second outer layer wherein the first outer layer and/or second outer layer consists of a heterophasic propylene copolymer composition comprising a heterophasic propylene copolymer, wherein the heterophasic propylene copolymer is present in an amount of at least 95 wt % based on the heterophasic propylene copolymer composition, wherein the heterophasic propylene copolymer consists of a) a propylene-based matrix wherein the propylene-based matrix consists of a propylene homopolymer and b) a dispersed ethylene α-olefin copolymer, wherein the dispersed α-olefin copolymer, wherein the sum of the weight of the propylene-based matrix and the weight of the dispersed ethylene-α-olefin copolymer is 100 wt % based on the heterophasic propylene copolymer, wherein the amount of CXS in the heterophasic propylene copolymer composition is in the range from 20.0 to 35.0 wt % based on the heterophasic propylene copolymer composition, wherein the amount of the xylene-soluble matter (CXS) is measured according to ISO 16152:2005 in p-xylene at 25° C.

Polyolefin films are well balanced in terms of price and performance and are widely used, for example for packaging foods and goods, for coating of paper and other materials, or as lamination materials. Among the films, matte films are highly valued from an aesthetically perspective.

Examples of matte films that are currently on the market are for example disclosed in US2008/0220226A1 and US2004/0048084A1. US2008/0220226A1 discloses a laminate film comprising a polyolefin base layer; and a heat sealable matte resin layer comprising 15 to 30 wt % of a metallocene-catalyzed propylene-butene copolymer elastomer. US2004/0048084A1 discloses a matte biaxially oriented polypropylene film comprising at least one matte surface layer made of a composition comprising 100 parts by weight of a resin blend of 40-60 wt % of polyethylene (I) and 60-40 wt % of polypropylene (II), 0.005-0.04 parts by weight of a peroxide (III) and 0.1-0.5 parts by weight of a fluoroelastomer or a metal stearate (IV).

However, the matte films that are currently on the market involve the use of compounds of various polymers. By 2030 all plastic packaging within the European Union will need to be recyclable or reusable. In order to achieve that goal, it is necessary to simplify the design of the packaging as many recycling centres are only equipped for one type of polymer, such as polyethylene, polypropylene or polyethylene terephthalate. Therefore, using a monomaterial would make such recycling much more efficient. However, while rigid materials are primarily monomaterial-based, flexible materials have traditionally been multi-material, consisting of several layers of different types of plastics and often also including aluminium, which makes recycling more difficult. On the other hand, flexible materials can reduce the overall carbon footprint, since they are more lightweight as compared to rigid packaging alternatives such as glass and metal.

Therefore, it is the further object of the invention to provide a matte film, wherein the matte layer is primarily based on one type of polyolefin.

Such object is achieved by this embodiment.

The matte film of the invention has the advantage of being matte and flexible, while at the same time, the matte layer is primarily based on only one type of polyolefin. Not only does this make recycling more efficient, in addition, the step of compounding can be omitted in the production process, leading to a further lowering of the carbon footprint as less energy will be needed in the film production chain.

In addition, it has been found that the film of the invention meets the mechanical properties needed for a good mechanical performance. Furthermore, impact resistance at low temperature may even be improved as compared to the existing matte films.

Furthermore, in comparison to a matte layer prepared from a compound of various polymers, the layer thickness may be reduced. This allows for downgauging as thinner films may be prepared and will lower the carbon footprint even further as less material will be needed to achieve a film with the same matte effect and mechanical properties.

In this matte film embodiment, the inner layer may consists of one or more layers, for example polyolefin layers or barrier layers.

In a special embodiment of the matte film, the inner layer comprises one or more further layers, wherein at least one of, preferably all of the one or more further layers consist of a polypropylene composition comprising a polypropylene chosen from the group selected of heterophasic propylene copolymer, propylene homopolymer, propylene random copolymer, propylene terpolymer and mixtures thereof, preferably wherein the polypropylene composition is present in an amount of at least 95 wt % based on the layer.

Examples of heterophasic propylene copolymers include but are not limited to those mentioned herein. Examples of propylene random copolymers include but are not limited to propylene-ethylene copolymers, propylene-butene copolymers, propylene-hexene copolymers and mixtures thereof. Examples of propylene terpolymers include but are not limited to propylene-ethylene-butene copolymers, propylene-ethylene-hexene copolymers and mixtures thereof.

In case of the matte film, the film preferably has a thickness in the range from 15 to 200 μm, preferably from 15 to 60 μm, more preferably from 15 to 35 μm.

The first outer layer and/or second outer layer comprising the heterophasic polypropylene composition preferably has a thickness in the range from 0.5 to 5.0 μm, preferably in the range from 0.7 to 3.0 μm, more preferably in the range from 0.8 to 2.0 μm.

In this embodiment, preferably, the film has a surface roughness Rq of at least 0.270 μm, preferably of at least 0.280, more preferably of at least 0.290, more preferably of at least 0.300, even more preferably of at least 0.310, most preferably of at least 0.320 as determined using Keyence digital microscopy imaging on the first or the second outer layer comprising the heterophasic propylene copolymer composition and/or wherein the number of gels having an equivalent diameter of more than 0.50 mm as determined on a 6.0 $m^2$ film using an optical film surface analyser is less than 1.0, preferably less than 0.70, more preferably less than 0.50, for example less than 0.40, for example less than 0.30 gels/$m^2$ and/or wherein the number of gels having an equivalent diameter of more than 0.9 mm as determined on a 6.0 $m^2$ film using an optical film surface analyser is less than 0.10, preferably less than 0.070, more preferably less than 0.050, for example less than 0.040, for example less than 0.030, for example less than 0.010, for example 0 gels/$m^2$.

Gels are to be understood to be distinct polymeric domains in the polymer material that do not show thermoplastic properties, for example wherein individual polymer molecules are chemically bound to each other as a result of crosslinking, or for example wherein polymer molecules of a high molecular weight form physical bonds which are not reversible by exposing the material to a heat processing step such as is the case in thermoplastic processing, for example by forming entanglements and/or dense crystalline domains.

The equivalent diameter of a gel is to be understood to be the average of the length and the width of the surface area of the gel as determined via on-line measurement as described above. For example, the equivalent diameter may be the average of the largest diameter of a gel and the largest diameter of said gel in a direction perpendicular direction to said largest diameter of said gel.

Preferably, in this embodiment, the film has a gloss 45° in machine and/or transverse direction as measured on the first or the second outer layer comprising the heterophasic propylene copolymer composition of at most 5.5 GU, preferably of at most 5.0 GU, more preferably of at most 4.5 GU, wherein the Gloss 45° is measured according to ASTM D2457-13.

Preferably, in this embodiment, the film has a haze as determined using ASTM D1003-13 of at least 75%, preferably of at least 80%, more preferably of at least 85%, most preferably of at least 87% and for example of at most 95%.

The matte films of the invention are especially suitable to be used in articles for which a matte appearance is important. For example for packaging of food or cosmetics.

Therefore, the invention also relates to articles comprising said matte films for example a blown film, a cast film or a biaxially oriented film; for example wherein the article is a corrugated sheet or a (food) package or a package for cosmetics, preferably wherein the package is a pouch, more preferably wherein the package is a retort pouch.

It is noted that the invention relates to the subject-matter defined in the independent claims alone or in combination with any possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Preparation of HECO 1

Gas-phase polymerizations were performed in a set of two horizontal, cylindrical gas phase reactors in series to prepare the heterophasic propylene copolymers HECO11. The homopolymer was formed in the first reactor (R1) and an ethylene-propylene copolymer rubber in the second one (R2) to prepare a heterophasic propylene copolymer. Both reactors were operated in a continuous way. The first reactor was equipped with an off-gas port for recycling reactor gas through a condenser and back through a recycle line to the nozzles in the reactor. In both reactors, a mixture of liquid propylene containing up to 30% propane was used as the quench liquid. A high activity procatalyst produced in accordance with example 1 of WO2015/091983 (hereby incorporated by reference) was introduced into the first reactor as a slurry in mineral oil. Diisopropyl-dimethoxysilane (DiPDMS) was used as external donor and triethylaluminium (TEAL) was used as co-catalyst. The external donor and co-catalyst were fed at an Al/Ti ratio of 120 and a Si/Ti ratio of 12 to the first reactor. During operation, polypropylene powder produced in the first reactor was discharged through a powder discharge system into the second reactor. The polymer bed in each reactor was agitated by paddles attached to a longitudinal shaft within the reactor. The reactor temperature and pressure were 67.5° C. and 2.32 MPa in the first reactor and for the copolymer synthesis at 63° C. and 2.56 MPa in the second reactor. Hydrogen was fed independently to both reactors to control a melt flow index ratio over the homopolymer powder and copolymer powder. In this respect, RCC2 is the amount of ethylene incorporated in the rubber fraction (wt. %) and RC is the amount of rubber incorporated in the impact copolymer (wt. %) determined by $^{13}$C-NMR spectroscopy.

TABLE 1

Reaction conditions and properties of the
heterophasic propylene copolymer.

| Value | unit | HECO 1 |
|---|---|---|
| R1 | | |
| T | ° C. | 67.5 |
| P | MPa | 2.32 |
| H2/C3 | (mol/mol) | 0.0064 |
| Al/Ti | (mol/mol) | 120 |
| Si/Ti | (mol/mol) | 12 |
| MFI$_{PP}$ | (dg/min) | 5.2 |
| R2 | | |
| T | ° C. | 63 |
| p | MPa | 2.56 |
| H2/C3 | (mol/mol) | 0.0049 |
| C2/C3 | (mol/mol) | 0.3564 |
| MFI$_{heterophasic}$ | (dg/min) | 1.65 |
| MFI$_{rubber}$ | (dg/min) | 0.048 |
| RC | (wt %) | 24.6 |
| RCC2 | (wt %) | 49.2 |
| TC2 | (wt %) | 12.1 |

Si/Ti is the ratio of the external donor (DiPDMS) to the procatalyst

Al/Si is the ratio of the co-catalyst (TEAL) to the external donor (DiPDMS)

H2/C3 is the molar ratio of hydrogen to propylene.

Additives Used to Prepare Granulate of HECO 1

500 ppm calcium stearate
1500 ppm antioxidants
5000 ppm talc

The compositions of example 1 was prepared by extruding the HECO 1 in a twin screw extruder CMP362 (product of Japan Steel Works) with the additives to prepare granulate. Prior to dosing to the hopper of the extruder, the talcum and other additives were mixed with the HECO 1.

Preparation of the Film

The HECO 1 granulate of example 1 was processed into single-layer films having a thickness of 25 μm by using a Göttfert flat foil line (type 015.35.0) system obtainable from Optical Control Systems GmbH. The extruder was operated at screw speed of 25 rpm, with a temperature profile along the extruder screw of 190° C. in the material feed zone to 250° C. in the die zone. The extruder was equipped with a die having a coat hanger design, i.e. where the width of the die opening expands in a linear way, to a width of 320 mm. The die had a gap of 0.4 mm.

The cast film system comprised a dual chrome plated steel chill roll system having a temperature control system. The chill roll was operated at a temperature of 15° C. The cast film system comprised two rubber nip rolls to pull the film. The speed of the cast film system was controlled by the nip rolls to produce film at a speed of 25 mm/min.

As comparative example 1 (CE1), granulate of the heterophasic propylene copolymer Ineos Eltex RF110, which is commercially available from INEOS, was processed into a single-layer film as described above.

As comparative example 2 (CE2), a commercially available film K VFC 15/16 from Verbano Film S.r.l. having a thickness of 150 μm was used. The matt layer in this film is prepared from a compound of various materials.

As comparative example 3 (CE3), granulate of the heterophasic propylene copolymer Total PPC 2660, which is commercially available from Total, was processed into a single-layer film as described above.

Measurement Methods

Comonomer Content (TC2)

The amount of the propylene-based matrix, the amount of ethylene incorporated into the dispersed ethylene-α-olefin copolymer (also referred to herein as 'rubber phase' or 'RC') (RCC2) and the dispersed ethylene-α-olefin copolymer (RC) and the total amount of ethylene incorporated into the heterophasic propylene copolymer (TC2) were determined by $^{13}$C-NMR spectroscopy. $^{13}$C-NMR is executed on the heterophasic propylene copolymer composition (granulate), which will give the values for the RC, RCC2 and RC and TC2.

To this end, approximately 150 mg of granulate was dissolved in 1,1,2,2-tetrachloroethane-d2 (TCE-d2). To ensure a homogeneous solution, the sample preparation has been conducted in a heated rotary oven. The NMR measurements were carried out in the solution-state using a Bruker 500 Advance III HD spectrometer operating at 500.16 and 125.78 MHz for $^1$H and $^{13}$C, respectively, and equipped with a 10 mm DUAL cryogenically-cooled probe head operating at 125° C. The $^{13}$C-NMR experiments were performed using standard single pulse excitation utilizing the NOE and bi-level WALTZ16 decoupling scheme (Zhou Z. et al. J. Mag. Reson 187 (2007) 225. A total of 512 transients were acquired per spectrum. The spectra were calibrated by setting the central signal of TCE's triplet at 74.2 ppm. Quantitative $^{13}$C NMR spectra were processed, integrated and relevant quantitative properties determined from the integrals using proprietary computer programs.

CXS, CXI

The amount of the xylene-soluble matter (CXS) and xylene-insoluble matter (CXI) of the granulate was determined according to ISO 16152:2005 in p-xylene at 25° C. 1 gram of granulate and 100 ml of xylene were introduced in a glass flask equipped with a magnetical stirrer. The temperature was raised up to the boiling point of the solvent. The so obtained clear solution was then kept under reflux and stirring for further 15 minutes. Heating was stopped and the isolating plate between heating and flask was removed. The solution was then allowed to cool under stirring for 5 minutes. The closed flask was then kept for 30 min in a thermostatic water bath at 25° C. for 30 min. The formed solid was filtered on filtering paper. 25 ml of the filtered liquid was then poured in a previous weighed aluminium container. Subsequently, the container was heated in a stove of 140° C. for 2 hours, under nitrogen flow and vacuum, to remove the solvent by evaporation. The container was then kept in an oven at 140° C. under vacuum until constant weight was obtained. The weight percentage of polymer soluble in xylene at room temperature was then calculated.

Tm Melting Temperature and Tc Crystallization Temperature

Melting temperature™ and crystallization temperature (Tc) measurements of the granulate were performed using a Differential Scanning calorimeter (DSC) TA Q20 and an Intracooler capable of reaching −90° C. The measurements were done under nitrogen flow to avoid degradation. The methodology followed was:

First Heating: −90° C. to 230° C. heating speed 10° C./min (3 min hold at the end temperature)
Cooling: 230° C. to −90° C. cooling speed 10° C./min
Second Heating: −90° C. to 230° C. heating speed 10° C./min Both crystallization and melting curves were obtained during the 10° C./min cooling and heating scans. Melting temperatures were taken as the peak of the endotherms of the second heating curves. Crystallization temperatures were taken as the peak of the exotherms of the first cooling curve.

SIT Seal Initiation Temperature

The sealing initiation temperature was determined according to ASTM F88 on the 25 μm film prepared as described above. This method determines the sealing temperature range of polypropylene films, in which the films can be sealed according to the conditions given below. The lower limit (heat sealing initiation temperature (SIT) is the sealing temperature at which a sealing strength of 0.5 N/10 mm is achieved. The preparation of fin-seals according to ASTM F2029, was performed on the chill roll side of the 25 μm film with the following parameters:

Specimen width: 15 mm
Seal pressure: 3 bar
Dwell time: 1 sec (time seal bars are in contact)
Test speed 200 mm/min (speed grip separation)
Initial gripping distance: 10 mm
Start temperature: 120° C.
Increments: 5° C.

16

Specimen was sealed A to A at each seal bar temperature and seal strength was determined at each step. The temperature is determined, at which the seal strength reaches 0.5 N/10 mm.

GPC/SEC

The number average molecular weight (Mn) and the weight average molecular weight (Mw) of the granulate were determined using ISO16014-1(4):2003. SEC-DV was used with universal calibration. SEC measurements were performed on PolymerChar GPC system. The samples were dissolved in 1,2,4-trichlorobenzene (TCB) stabilized with 1 g/L butylhydroxytoluene (BHT) at concentrations of 0.3-1.3 mg/mL for 4 hours at 160° C. 300 μL of polymer solution was injected and the mobile phase flow rate was 1.0 ml/min. Infrared detection IR5 MCT and a differential viscometer were used. For setting up the universal calibration line polyethylene standards were used.

MFI

The MFI of the granulate was determined at 230° C. and 2.16 kg according to ISO 1133:2011.

The MFIrubber was calculated according to the following formula:

$$MFIrubber = 10^{\left(\frac{\text{Log } MFIheterophasic - \text{matrix content} * \text{Log } MFImatrix}{\text{rubber content}}\right)}$$

wherein

MFIheterophasic is the MFI (dg/min) of the heterophasic propylene copolymer composition measured according to ISO1133-1:2011 (2.16 kg/230° C.), MFImatrix is the MFI (dg/min) of the propylene-based matrix measured according to ISO1133-1:2011 (2.16kg/230° C.), matrix content is the fraction of the propylene-based matrix in the heterophasic propylene copolymer, rubber content is the fraction of the dispersed ethylene-α-olefin copolymer in the heterophasic propylene copolymer (RC). For the avoidance of any doubt, Log in the formula means $\log_{10}$.

With fraction is meant the amount as compared to 1, so for example if the propylene-based matrix is present in an amount of 89 wt % based on the heterophasic propylene copolymer, the fraction is 0.89.

Gel Content Determination

The gel content was determined via on-line measurement of the film in the cast film system using an using an Optical Control System on line scan camera FS-3, equipped with software OCS Filmtest FS-3, (version 3.59a), wherein an optical film surface analyser is positioned between the chill roll system and the nip rolls. The surface analyser comprised a CCD line scan camera with a resolution of 50×75 μm. A film sample with a total surface size of 6.0 m2 was tested.

Impact Strength

For purpose of the present invention, impact strength is determined by measuring the Izod impact strength on the 25

μm film at −20, 0 and 23° C. according to ISO 7765-2, Test geometry:circular surface with a diameter of 80 mm.

Based on these measurements, the following parameters are determined:

Peak force FM (The maximum force exerted by the striker in the direction of impact during the test)

Deformation at peak force sM (The deformation in the direction of impact at the centre of the test specimen corresponding to the peak force).

Energy at peak force (The area under the force-deformation curve bounded by the origin, the peak force and the deformation at peak force)

Gloss

Gloss 45° on the 25 μm film on the non chill roll side was measured according to ASTM D2457-13, specimen dimensions 150×80 mm. 6 specimens were tested, 3 in each principal direction, The average results for the 3 transverse direction measurements and the average results for the 3 machine direction measurements were recorded.

Haze

Haze was determined on the 25 μm film on the non chill roll side according to ASTM D1003-13, specimen dimensions 50×50 mm. 3 specimens were tested and the average value was recorded.

Roughness Parameter Rq

Sample Preparation

A piece of film with size of 1 cm×1 cm was carefully cut from the 25 μm film of example 1 and of comparative examples 1 and 2. The piece of film was adhered by a two-sided tape to a glass slide for both Keyence digital microscopy imaging without further treatment. In case of comparative examples 1 and 2, the surface with the least matt appearance was placed in a position such that it faced the glass, that is the most matt surface was placed on the outside.

Keyence Digital Microscopy Imaging

Keyence VHX5000 Digital microscopy with a 100-1000 magnification lens was used to obtain both the 2D and 3D optical images of the film surface area. For 2D imaging, magnifications of 500×, 700× and 1000× were used in HDR mode at randomly selected areas of the film surface. Depth composition mode was used to obtain the 3D images from the film surface with 1000×. From the 3D images, 2 points line profile was made at 3 different randomly selected locations of the images. The raw profile data were exported for further roughness analysis.

Data Analysis on Keyence Height Profile

Per sample, two areas were imaged at 1000× for 3D surface analysis. Three height profiles were then extracted from each of the areas. Data analysis on the extracted height profile was performed at MATLAB 2017b platform to determine roughness value of the film under investigation. The roughness typically corresponds to the high frequency component in the measured profile. To extract the high frequency signal, $3^{rd}$ order high-pass Butterworth filter (see S. Butterworth, "On the Theory of Filter Amplifiers", Wireless Engineer, vol. 7, 1930, pp. 536-541, hereby incorporated by reference) was applied onto the profile data with a normalized cut-off frequency 0.02, which flattened the curviness and texture variation. Based on the extracted high-frequency signal, the arithmetical mean deviation of the assessed profile, $R_a$, was calculated with the function as follows:

$$R_a = \frac{1}{n}\sum_{n}^{i}|x_i - \bar{x}|$$

The root mean squared of the assessed profile, $R_q$, was calculated with the function as follows:

$$R_q = \sqrt{\frac{1}{n}\sum_{n}^{i}(x_i - \bar{x})^2}$$

where n is the number of data points on the profile and $\bar{x}$ is the mean of the profile line.

The results are reported in Tables 1 and 2 below.

As can be seen from Table 1, the impact of the film of the invention is maintained for all testing temperatures (23° C., 0° C. and −20° C.). Especially, the cold impact (impact at −20° C.) is increased as compared to the film consisting of the commercially available Ineos Eltex RF110 heterophasic propylene copolymer (CE1) and the commercially available Total PPC 2660 heterophasic propylene copolymer (CE3). Furthermore, the film of the invention shows a higher Tm-SIT, indicating an improved processing window.

TABLE 1

| Film measurements. | | | | |
|---|---|---|---|---|
| | | E1 | CE1 | CE3 |
| TC2 | wt % | 12.1 | 8.2 | 8.3 |
| RC | wt % | 24.6 | 16.0 | 14.8 |
| RCC2 | wt % | 49.2 | 51.1 | 56.3 |
| MFI (2, 16 kg) granulate | dg/min | 1.8 | 0.84 | 0.8 |
| gelcount | | | | |
| # gels > 0.2 mm | gels/m2 | 23.9 | 21.4 | 24.8 |
| # gels > 0.5 mm | gels/m2 | 0.2 | 0.2 | 0.1 |
| # gels > 0.9 mm | gels/m2 | 0 | 0 | 0.4 |
| Impact test 23° C., peak force | N | 27 | 31.6 | ND |
| Impact test 0° C., peak force | N | 28.6 | 11.6 | 12.1 |
| Impact test −20° C., peak force | N | 31.4 | 12.1 | 9.5 |
| Seal initiation temperature (SIT) | ° C. | 116 | 125 | 123 |
| Melting temperature (Tm) | ° C. | 165 | 163 | ND |
| Crystallization temperature (Tc) | ° C. | 123 | 115 | ND |
| Tm − SIT | ° C. | 49 | 38 | ND |

ND = not determined

As can be seen from Table 2, the film of the invention has a lower gloss (45°) and a surface roughness that is comparable to the commercially available matte film (CE2). The commercially available matte film has a surface layer based on a compound of various polymers. The film of the invention has the advantage that a similar matte appearance can be achieved by a single polymer and there is no need to use a compound.

As can be seen by comparing the film of CE1 to the example of the invention E1, compared to films comprising a heterophasic propylene copolymer having a low RC, the film of the invention has a lower gloss (45°) and an increased surface roughness. A lower gloss and increased surface roughness are indications of a matt look.

TABLE 2

| | | E1 | CE1 | CE2 |
|---|---|---|---|---|
| | | Matte measurements | | |
| TC2 | wt % | 11.9 | 8.2 | |
| RC | wt % | 24.3 | 16.0 | |
| RCC2 | wt % | 49.0 | 51.1 | |
| MFI (2, 16 kg) | dg/min | 1.8 | 0.84 | |
| Gloss (45°) MD | GU | 4.3 | 8.4 | 5.0 |
| Gloss (45°) TD | GU | 4.3 | 8.3 | 5.1 |
| Haze | % | 90.7 | 72.2 | 92.5 |
| Roughness parameter Rq | μm | 0.332 | 0.265 | 0.329 |

ND = not determined

The invention claimed is:

1. A film comprising at least one first layer consisting of a heterophasic propylene copolymer composition comprising a heterophasic propylene copolymer, wherein the heterophasic propylene copolymer is present in an amount of at least 95 wt % based on the heterophasic propylene copolymer composition, wherein the heterophasic propylene copolymer consists of a) a propylene-based matrix wherein the propylene-based matrix consists of a propylene homopolymer and b) a dispersed ethylene α-olefin copolymer, wherein a sum of the weight of the propylene-based matrix and the weight of the dispersed ethylene-α-olefin copolymer is 100 wt % based on the heterophasic propylene copolymer, wherein an amount of xylene-soluble matter (CXS) in the heterophasic propylene copolymer composition is in a range from 20.0 to 35.0 wt % based on the heterophasic propylene copolymer composition, wherein the CXS is measured according to ISO 16152:2005 in p-xylene at 25° C., wherein a total amount of ethylene monomer units in the heterophasic propylene copolymer composition is in a range from 9.0 to 15.0 wt % based on the heterophasic propylene copolymer composition, wherein an amount of propylene-based matrix is in the range from 65 to 80 wt % based on the heterophasic propylene copolymer, wherein an amount of dispersed ethylene-α-olefin copolymer is in the range from 20 to 35 wt % based on the heterophasic propylene copolymer, wherein a melt flow rate of the propylene-based matrix as determined according to ISO1133-1:2011 using 2.16 kg at a temperature of 230° C. ($MFR_M$) is in a range from 1.0 to 10.0 dg/min, and wherein the number of gels having an equivalent diameter of more than 0.9 mm as determined on a 6.0 m$^2$ film using an optical film surface analyser is less than 0.10 gels/m$^2$.

2. The film according to claim 1, wherein the amount of ethylene monomer units in the ethylene-α-olefin copolymer is in a range from 40 to 60 wt % based on the ethylene-α-olefin copolymer.

3. The film according to claim 1, wherein a ratio of a melt flow rate of the propylene-based matrix as determined according to ISO1133-1:2011 using 2.16 kg at a temperature of 230° C. ($MFR_M$) to a melt flow rate of the ethylene-α-olefin copolymer as determined according to ISO1133-1:2011 using 2.16 kg at a temperature of 230° C. ($MFR_R$) is in a range from 1.0 to 1000.

4. The film according to claim 1, wherein the Mw/Mn of the heterophasic propylene copolymer composition is in a range from 6.0 to 10.0, wherein Mw stands for the weight average molecular weight and Mn stands for the number average weight and wherein Mw and Mn are measured according to ISO16014-1(4):2003.

5. The film according to claim 1, wherein $$Tm-SIT \geq 40° C.$$

wherein SIT stands for the lowest temperature at which a fin seal of a film prepared according to ASTM F2029-16 achieves a sealing strength of 0.5N/10 mm as determined by ASTM F88-15 wherein Tm stands for melting temperature of the heterophasic propylene copolymer composition as determined by differential scanning calorimetry using a second heating curve and wherein cooling and heating rates of 10° C./min are used.

6. The film according to claim 1, wherein the heterophasic propylene copolymer is produced from propylene and ethylene in a polymerization process, in the presence of a) a Ziegler-Natta procatalyst comprising a compound of a transition metal of Group 4 to 6 of IUPAC, a Group 2 metal compound and an internal donor, wherein said internal donor is a non-phthalic compound;

b) a co-catalyst, and c) optionally an external donor.

7. The film according to claim 1, wherein the film further comprises one or more further layers, wherein at least one of the one of more further layers consist of a polypropylene composition comprising a polypropylene chosen from a heterophasic propylene copolymer, a propylene homopolymer, a propylene random copolymer, a propylene terpolymer, and mixtures thereof.

8. The film according to claim 1, wherein the film has a thickness in a range from 15 to 200 μm.

9. The film according to claim 1, wherein the film is a multi-layer film comprising (a) a first outer layer, (b) an inner layer, and (c) a second outer layer wherein the first outer layer and/or the second outer layer consists of the heterophasic propylene copolymer composition comprising the heterophasic propylene copolymer.

10. The film according to claim 1, wherein the amount of ethylene monomer units in the ethylene-α-olefin copolymer is in a range from 45 to 55 wt % based on the ethylene-α-olefin copolymer.

11. The film according to claim 1, wherein the number of gels having an equivalent diameter of more than 0.9 mm as determined on a 6.0 m$^2$ film using an optical film surface analyser is 0 gels/m$^2$.

12. The film of claim 7, wherein the polypropylene composition is present in an amount of at least 95 wt % based on the layer.

13. The film of claim 9, wherein the inner layer comprises one or more further layers, wherein at least one of the one or more further layers consists of a polypropylene composition comprising a polypropylene chosen from a heterophasic propylene copolymer, a propylene homopolymer, a propylene random copolymer, a propylene terpolymer and mixtures thereof.

14. An article comprising the film of claim 1.

* * * * *